United States Patent
Imamura et al.

(10) Patent No.: US 11,373,293 B2
(45) Date of Patent: Jun. 28, 2022

(54) METHOD FOR BUILDING IMAGE DETERMINATION MODEL, IMAGE DETERMINATION MODEL, AND IMAGE DETERMINATION METHOD

(71) Applicant: SCREEN HOLDINGS CO., LTD., Kyoto (JP)

(72) Inventors: Atsushi Imamura, Kyoto (JP); Kazuhiro Kitamura, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 202 days.

(21) Appl. No.: 16/904,697

(22) Filed: Jun. 18, 2020

(65) Prior Publication Data

US 2020/0410655 A1 Dec. 31, 2020

(30) Foreign Application Priority Data

Jun. 27, 2019 (JP) .............................. JP2019-119420

(51) Int. Cl.
*G06T 7/00* (2017.01)
*G06N 20/00* (2019.01)

(52) U.S. Cl.
CPC .............. *G06T 7/001* (2013.01); *G06N 20/00* (2019.01); *G06T 2207/30144* (2013.01)

(58) Field of Classification Search
CPC ........... G06T 7/001; G06T 2207/30144; G06T 2207/10024; G06T 2207/20081; G06T 2207/20084; G06T 7/0004; G06N 20/00; G06N 3/0454; G06N 3/084; G06F 3/1282; G06F 3/1259; G06F 3/121; G06F 3/1208

See application file for complete search history.

(56) References Cited

U.S. PATENT DOCUMENTS

2019/0026906 A1 1/2019 Kawai

FOREIGN PATENT DOCUMENTS

| JP | 2005-156334 A | 6/2005 | | |
|---|---|---|---|---|
| JP | 2018-195119 A | 12/2018 | | |
| WO | 2017/154630 A1 | 9/2017 | | |
| WO | WO-2018207524 A1 | * 11/2018 | ........... | G01N 27/416 |

* cited by examiner

*Primary Examiner* — Christopher Wait
(74) *Attorney, Agent, or Firm* — McDermott Will & Emery LLP

(57) ABSTRACT

A method for building an image determination model that determines whether a print image is a good image or a failure image includes a step of determining whether the print image is a high-density image or a low-density image; a step of generating teaching data by combining pseudo-failure data with to-be-combined image data, based on a result of the determination; and a step of performing machine learning. Regarding the combining of the pseudo-failure data, for a print image determined to be the high-density image, low-density pseudo-failure data is combined with to-be-combined image data, and for a print image determined to be the low-density image, high-density pseudo-failure data is combined with to-be-combined image data.

14 Claims, 16 Drawing Sheets

Fig.26
PRIOR ART
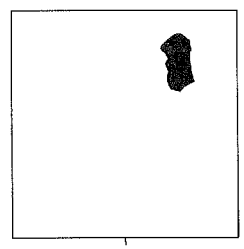 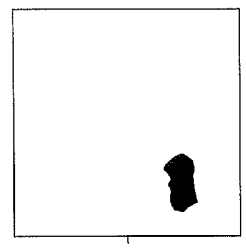
971　　　972

METHOD FOR BUILDING IMAGE DETERMINATION MODEL, IMAGE DETERMINATION MODEL, AND IMAGE DETERMINATION METHOD

BACKGROUND OF THE INVENTION

Field of the Invention

The present invention relates to a method for building an image determination model that determines whether a print image outputted to a printing medium from a printing device (typically, an inkjet printing device) is a good image or a failure image.

Description of Related Art

In recent years, there has been a strong demand for an improvement in the quality of printed matter, and accordingly, the importance of checking printed matter has been increasing. Hence, an inkjet printing device including a checking device that checks a print state is actively spreading. The checking device detects in real time a print failure such as an ink smudge (e.g., smudges shown in a portion given reference sign 91 in FIG. 20) or a white streak, by comparing and checking a captured image obtained by capturing printed paper by a camera and an original image corresponding to data based on which printing is performed, against each other. Note that the white streak is a streak-like image resulting from missing ink upon printing. In FIG. 21, an example of a white streak is shown in a portion indicated by an arrow given reference sign 92. When a print failure such as those described above is detected by a check performed by the checking device, failure information (e.g., the type of the failure and a cut image of a failure location) is outputted as a check result from the checking device.

However, according to the conventional checking device, checking accuracy is insufficient, and check results include multiple pieces of false information (presentation of a print failure that is shown regarding the printed matter that is actually not a print failure). Hence, an operator makes a determination by a visual check as to whether a print failure has actually occurred for all print images having been determined by the checking device to be print failures. However, such a visual check is a great burden for the operator, and thus, there is a strong demand for a reduction in burden on the operator. Note that in the following, the state of a print image in which false information has occurred is referred to as "false failure" and the state of a print image in which a print failure has actually occurred is referred to as "true failure".

In order to achieve a reduction in burden on an operator's visual check, in recent years, an attempt has been made to classify check results outputted from the checking device into true failures and false failures, using artificial intelligence (AI) technology. According to this, an artificial intelligence model 95 including a neural network, etc., performs machine learning in advance that uses true-failure print images 93 and false-failure print images 94 (see FIG. 22). Then, data of a cut image of a failure location outputted from the checking device is inputted to the learned artificial intelligence model 95. By this, a determination is made as to whether the state of a target print image (cut image) is a true failure or a false failure. It is proposed that only true-failure results are presented to a user in the above-described manner.

Note that in relation to the present invention, the following prior art documents are known. Japanese Laid-Open Patent Publication No. 2005-156334 discloses a technique for automatically creating a large amount of failure images that are required for learning by a neural network. WO 2017/154630 A discloses a technique in which a differential image which is a difference between a combined image and a background image is used as learning data, by which even if an image includes an object similar in color or brightness to the background, the object can be identified. Japanese Laid-Open Patent Publication No. 2018-195119 discloses a technique for determining whether there is an abnormal change in check target data, on the basis of data for determination based on a difference between the check target data and extracted-feature data.

However, according to the conventional technique utilizing artificial intelligence technology, since a frequency of occurrence of print failures such as ink smudges and white streaks is low in the inkjet printing device, it is difficult to secure a sufficient number of pieces of learning data about true-failure data (data of true-failure print images). Although Japanese Laid-Open Patent Publication No. 2005-156334 discloses a technique for creating a large amount of failure images, it does not necessarily create only failure images that actually occur. Hence, it is conceivable that it is difficult to make a determination with sufficient accuracy.

In addition, printing of variable data (data that varies in image, text, etc., between pages) is often performed in the inkjet printing device. Therefore, normally, a background (original image) varies between print images that have turned out to be print failures. For example, when ink smudges have occurred in a plurality of pieces of paper, one piece of paper has an ink smudge on a scenic image and another piece of paper has an ink smudge on text. In addition, the shape of an ink smudge also varies. It is easy for a person to distinguish between a background and an ink smudge, but it is difficult for an artificial intelligence model to distinguish between a background and an ink smudge. As such, according to the conventional technique utilizing artificial intelligence technology, the background greatly affects learning results, and sufficient determination accuracy cannot be obtained. Regarding this, in the technique disclosed in WO 2017/154630 A and the technique disclosed in Japanese Laid-Open Patent Publication No. 2018-195119, differential images are used as learning data. When these techniques are applied to a distinction between a true failure and a false failure, for example, a combined image in which a smudge image (an image representing an ink smudge) is combined with a background image is created, and a differential image between the combined image and the background image serves as learning data used for machine learning. Note, however, that in this case, upon learning, for example, information indicating what density of a background image the smudge image is located on is removed. Hence, a distinction between a true failure and a false failure cannot be made taking into account the background. This will be further described below with reference to FIGS. 23 to 26.

Here, a background image given reference sign 961 in FIG. 23 and a smudge image given reference sign 962 in FIG. 23 are focused on. For the background image 961, it is assumed that an upper-half image has high density and a lower-half image has low density. In a case in which the smudge image is present in a high-density portion on the background image as shown in FIG. 24, since the smudge image is not noticeable, it is desirable that a determination result indicating that a target print image is a false failure is obtained by the artificial intelligence model. On the other hand, in a case in which the smudge image is present in a low-density portion on the background image as shown in FIG. 25, since the smudge image is noticeable, it is desirable that a determination result indicating that a target print image is a true failure is obtained by the artificial intelligence model. In a case shown in FIG. 24, a differential image between a combined image and the background image is an image given reference sign 971 in FIG. 26. In a case shown in FIG. 25, a differential image between a combined image and the background image is an image given reference sign 972 in FIG. 26. The image 971 and the image 972 only differ in their locations of the smudge images, and other elements are the same between the image 971 and the image 972. Therefore, a determination result for the case shown in FIG. 24 is the same as a determination result for the case shown in FIG. 25. As such, the conventional technique utilizing artificial intelligence technology does not take into account a background upon distinguishing between a true failure and a false failure, and thus, a desired determination result cannot be obtained.

SUMMARY OF THE INVENTION

In view of the above-described matters, an object of the present invention is to enable to determine whether a print image outputted to a printing medium from a printing device (typically, an inkjet printing device) is a failure image (true-failure image), with sufficient accuracy.

One aspect of the present invention is directed to a method for building an image determination model that determines whether a print image outputted to a printing medium from a printing device is a good image or a failure image, the method including:

a density determining step of determining whether the print image is a high-density image or a low-density image, on a basis of captured-image data or original-image data representing an original image of the print image, the captured-image data being obtained by capturing the print image on the printing medium;

a teaching data generating step of generating first teaching data by combining pseudo-failure data with to-be-combined image data, based on a result of the determination in the density determining step, the captured-image data or the original-image data serving as the to-be-combined image data, and the first teaching data being teaching data corresponding to the failure image; and a learning step of performing machine learning using the first teaching data and second teaching data, the second teaching data being teaching data corresponding to the good image, wherein high-density pseudo-failure data and low-density pseudo-failure data are used as the pseudo-failure data, and in the teaching data generating step, for a print image determined in the density determining step to be the high-density image, the first teaching data is generated by combining the low-density pseudo-failure data with corresponding to-be-combined image data, and for a print image determined in the density determining step to be the low-density image, the first teaching data is generated by combining the high-density pseudo-failure data with corresponding to-be-combined image data.

According to such a configuration, using captured-image data or original-image data as to-be-combined image data, pseudo-failure data is combined with the to-be-combined image data, by which first teaching data which is teaching data corresponding to a failure image is generated. By this, even if a frequency of occurrence of print failures is low in the printing device, a sufficient number of pieces of first teaching data can be prepared as learning data. Therefore, a determination as to whether a print image is a failure image (true-failure image) can be accurately made.

Another aspect of the present invention is directed to an image determination model that has been learned and that determines whether a print image outputted to a printing medium from a printing device is a good image or a failure image, the image determination model including:

a neural network unit configured to hold a parameter determined by machine learning; and a result output unit configured to output a result of a determination as to whether the print image is a good image or a failure image, on a basis of determination data outputted from the neural network unit, wherein the parameter is determined by machine learning that uses first teaching data and second teaching data, the first teaching data being teaching data corresponding to the failure image, and the second teaching data being teaching data corresponding to the good image, and the first teaching data includes data generated by combining high-density pseudo-failure data with to-be-combined image data corresponding to a low-density print image; and data generated by combining low-density pseudo-failure data with to-be-combined image data corresponding to a high-density print image, captured-image data or original-image data serving as the to-be-combined image data, the captured-image data being obtained by capturing the print image on the printing medium, and the original-image data representing an original image of the print image.

Still another aspect of the present invention is directed to an image determination method that determines whether a print image outputted to a printing medium from a printing device is a good image or a failure image, the method including:

a model building step of building an image determination model including a neural network unit that holds a parameter determined by machine learning; and a determining step of obtaining a result of a determination as to whether a target image is the good image or the failure image, using the image determination model, the target image being a determination target print image, wherein the model building step includes:
- a density determining step of determining whether the print image is a high-density image or a low-density image, on a basis of captured-image data or original-image data representing an original image of the print image, the captured-image data being obtained by capturing the print image on the printing medium;
- a teaching data generating step of generating first teaching data by combining pseudo-failure data with to-be-combined image data, based on a result of the determination in the density determining step, the captured-image data or the original-image data serving as the to-be-combined image data, and the first teaching data being teaching data corresponding to the failure image; and
- a learning step of performing machine learning using the first teaching data and second teaching data, the second teaching data being teaching data corresponding to the good image, high-density pseudo-failure data and low-density pseudo-failure data are prepared as the pseudo-failure data, in the teaching data generating step, for a print image determined in the density determining step to be the high-density image, the first teaching data is generated by combining the low-density pseudo-failure data with corresponding to-be-combined image data, and for a print image determined in the density determining step to be the low-density image, the first teaching data is generated by combining the high-density pseudo-failure data with corresponding to-be-combined image data, and the neural network unit holds a parameter obtained in the learning step.

These and other objects, features, modes, and advantageous effects of the present invention will become more apparent from the following detailed description of the present invention with reference to the accompanying drawings.

BRIEF DESCRIPTION OF THE DRAWINGS

FIG. 26 is a diagram for describing that in the conventional art the background is not taken into account upon distinguishing between a true failure and a false failure.

DETAILED DESCRIPTION OF PREFERRED EMBODIMENTS

One embodiment of the present invention will be described below with reference to the accompanying drawings.

<1. Overall Configuration of a Printing System>

Figure 1:
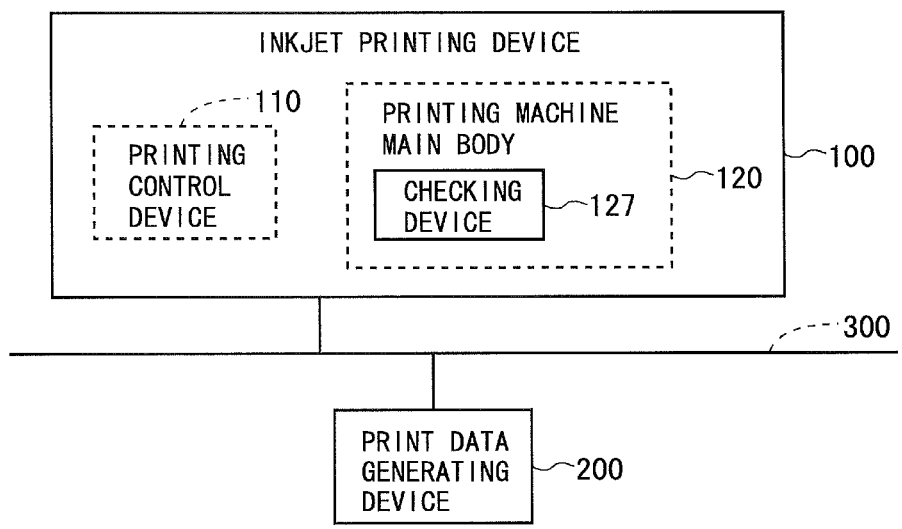
FIG. 1 is an overall configuration diagram of a printing system in one embodiment of the present invention.

FIG. 1 is an overall configuration diagram of a printing system in one embodiment of the present invention. The printing system includes an inkjet printing device 100 and a print data generating device 200. The inkjet printing device 100 and the print data generating device 200 are connected to each other by a communication line 300. The inkjet printing device 100 outputs a print image to a piece of printing paper 122 which is a printing medium, on the basis of print data which is digital data, without using a printing plate. The inkjet printing device 100 includes a printing machine main body 120 and a printing control device 110 that controls the printing machine main body 120. In the present embodiment, a checking device 127 that checks a print state is built in the printing machine main body 120. The print data generating device 200 generates print data by performing various types of processes on submitted data such as a PDF file. In addition, the print data generating device 200 determines whether a print image that is determined by the checking device 127 to be a print failure is a true-failure image or a false-failure image. Hereinafter, the true-failure image is simply referred to as "failure image" and the false-failure image and an image that is not determined by the checking device 127 to be a print failure are referred to as "good image".

Note that although in the present embodiment the checking device 127 is built in the printing machine main body 120, the configuration is not limited thereto. For example, the checking device 127 may be provided external to the printing machine main body 120 or may be a single device independent of the inkjet printing device 100.

<2. Configuration of the Inkjet Printing Device>

Figure 2:
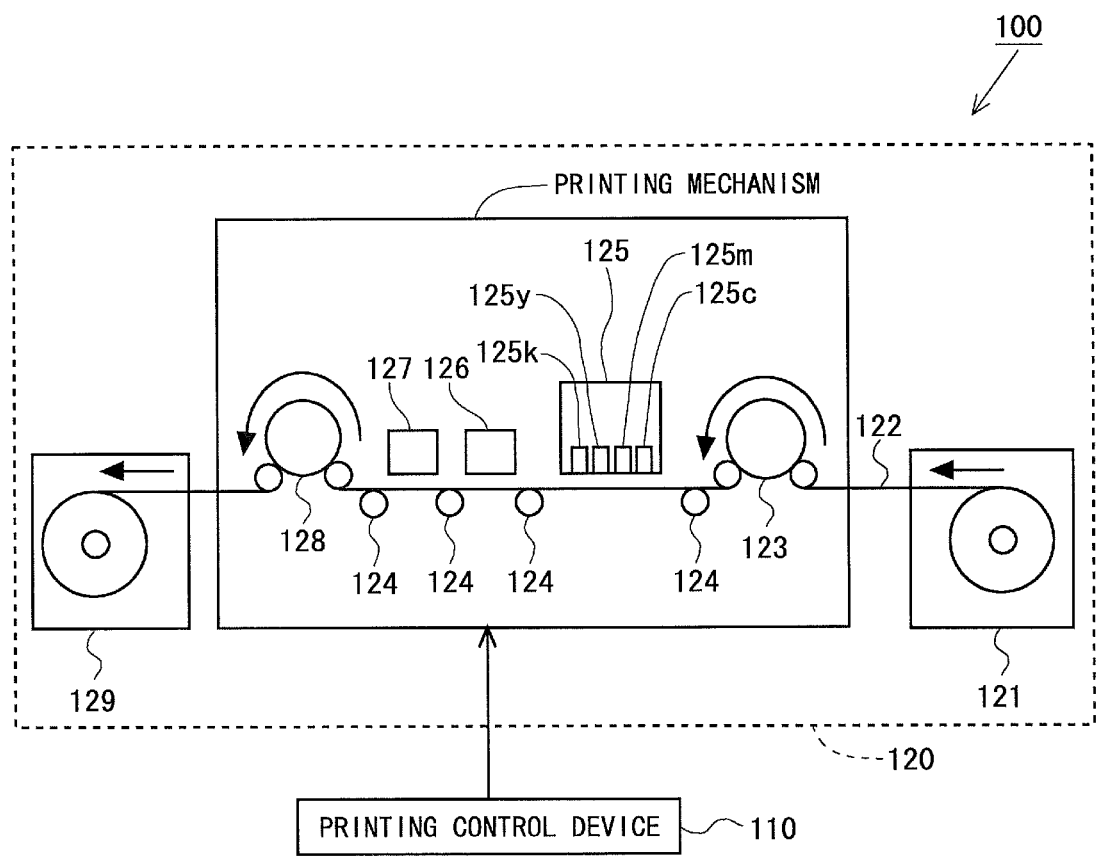
FIG. 2 is a schematic diagram showing an exemplary configuration of an inkjet printing device in the embodiment.

FIG. 2 is a schematic diagram showing an exemplary configuration of the inkjet printing device 100 in the present embodiment. As described above, the inkjet printing device 100 includes the printing machine main body 120 and the printing control device 110 that controls the printing machine main body 120.

The printing machine main body 120 includes a paper sending unit 121 that supplies printing paper (e.g., roll paper) 122 which is a printing medium; a first drive roller 123 for transporting the printing paper 122 into a printing mechanism; a plurality of support rollers 124 for transporting the printing paper 122 within the printing mechanism; a printing unit 125 that performs printing by discharging inks onto the printing paper 122; a drying unit 126 that dries the printed printing paper 122; the checking device 127 that checks the state of print on the printing paper 122; a second drive roller 128 for outputting the printing paper 122 from within the printing mechanism; and a paper roll-up unit 129 that rolls up the printed printing paper 122. As such, the printing paper 122 is transported in a certain transport direction from the paper sending unit 121 to the paper roll-up unit 129 by the first drive roller 123 and the second drive roller 128. The printing unit 125 includes a C inkjet head 125c, an M inkjet head 125m, a Y inkjet head 125y, and a K inkjet head 125k that discharge C (cyan), M (magenta), Y (yellow), and K (black) inks, respectively.

The printing control device 110 controls the operation of the printing machine main body 120 having the above-described configuration. When a printout instruction command is provided to the printing control device 110, the printing control device 110 controls the operation of the printing machine main body 120 such that the printing paper 122 is transported from the paper sending unit 121 to the paper roll-up unit 129. Then, during the process of transporting the printing paper 122, first, printing by discharge of inks from the inkjet heads 125c, 125m, 125y, and 125k in the printing unit 125 is performed, and then, the printing paper 122 is dried by the drying unit 126, and finally, a print state is checked by the checking device 127.

The checking device 127 has a camera built therein. Upon checking, the checking device 127 compares and checks a captured image obtained by capturing a print image outputted to the printing paper 122 by the camera and an original image corresponding to data based on which printing is performed and which is sent from the print data generating device 200, against each other. When a print failure (this print failure includes a true failure and a false failure) is detected by the comparison and checking, the aforementioned failure information is sent to the print data generating device 200 from the checking device 127.

Note that although here the configuration of the inkjet printing device 100 that performs color printing is exemplified, the present invention can also be applied to a case of adopting an inkjet printing device that performs monochrome printing. In addition, although here the configuration of the inkjet printing device 100 that uses water-based ink is exemplified, the present invention can also be applied to a case of adopting an inkjet printing device that uses UV ink (ultraviolet-curable ink) like an inkjet printing device for label printing, for example.

<3. Configuration of the Print Data Generating Device>

Figure 3:
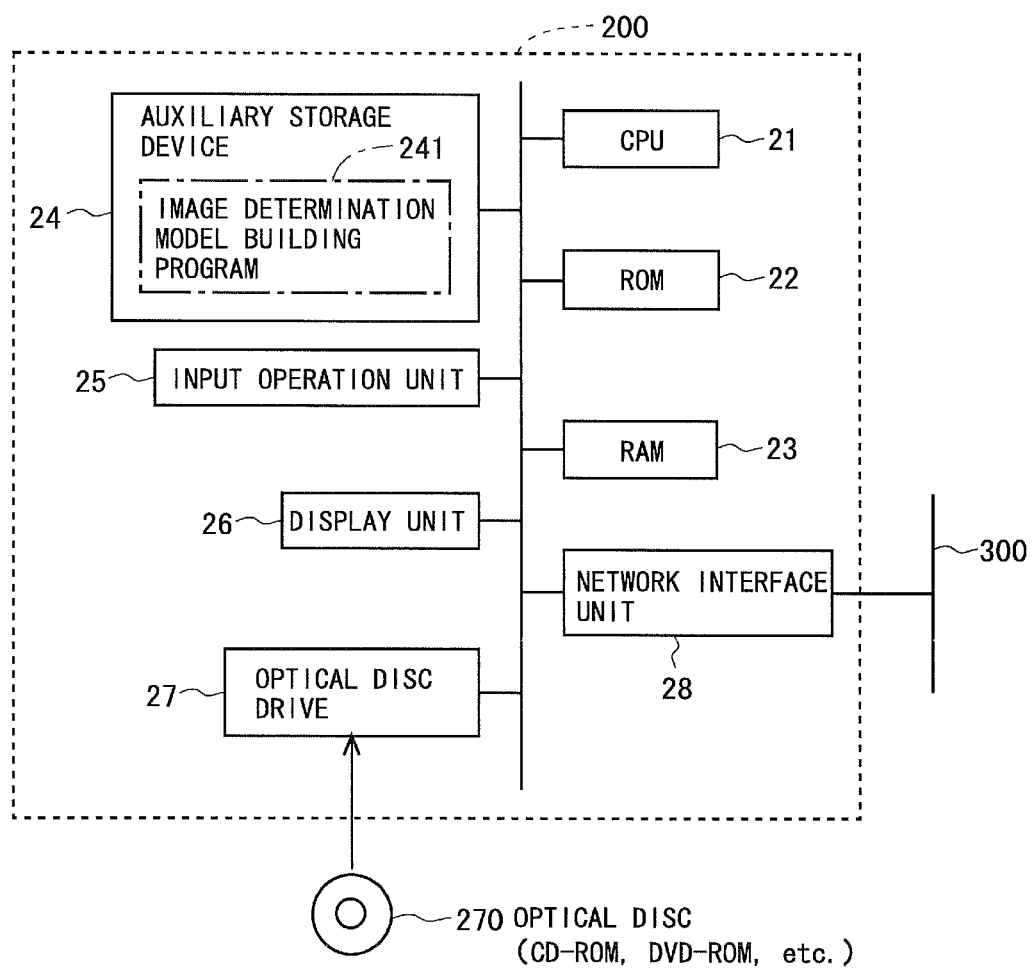
FIG. 3 is a hardware configuration diagram of a print data generating device in the embodiment.

FIG. 3 is a hardware configuration diagram of the print data generating device 200 in the present embodiment. The print data generating device 200 is implemented by a personal computer, and includes a CPU 21, a ROM 22, a RAM 23, an auxiliary storage device 24, an input operation unit 25 such as a keyboard, a display unit 26, an optical disc drive 27, and a network interface unit 28. Data (submitted data, failure information, etc.) which is sent via the communication line 300 is inputted into the print data generating device 200 through the network interface unit 28. Print data generated by the print data generating device 200 is sent via the network interface unit 28 to the inkjet printing device 100 through the communication line 300.

In the present embodiment, the print data generating device 200 builds an image determination model for determining whether a print image is a good image or a failure image. In addition, the print data generating device 200 determines, using the built image determination model (learned image determination model), whether a print image (typically, a print image that is determined by the checking device 127 to be a print failure) is a good image or a failure image. A program 241 for building an image determination model (image determination model building program) is stored in the auxiliary storage device 24. The image determination model building program 241 is provided stored in a computer-readable recoding medium such as a CD-ROM or a DVD-ROM. That is, a user, for example, purchases an optical disc (a CD-ROM, a DVD-ROM, etc.) 270 which is a recording medium for the image determination model building program 241, and places the optical disc 270 on the optical disc drive 27, by which the image determination model building program 241 is read from the optical disc 270 and installed on the auxiliary storage device 24. Alternatively, instead of this, the image determination model building program 241 which is sent through the communication line 300 may be received by the network interface unit 28 and installed on the auxiliary storage device 24.

<4. Overall Processing Flow>

<4.1 Overview>

In the present embodiment, an image determination model that determines whether a print image outputted to the printing paper 122 from the inkjet printing device 100 is a good image or a failure image is implemented by a convolutional neural network that performs machine learning. Learning in the image determination model is performed using teaching data corresponding to failure images and teaching data corresponding to good images. Note that for convenience of description, the teaching data corresponding to failure images is referred to as "first teaching data" and the teaching data corresponding to good images is referred to as "second teaching data".

Meanwhile, since the frequency of occurrence of print failures such as ink smudges and white streaks is low as described above, it is difficult to secure a sufficient number of pieces of learning data about the first teaching data. Hence, in the present embodiment, pseudo-failure data representing ink smudges and white streaks is prepared, and the pseudo-failure data is combined in various modes with captured-image data obtained by capturing print images which are good images, by which multiple pieces of first teaching data are generated. Note that, as the pseudo-failure data, high-density pseudo-failure data and low-density pseudo-failure data are prepared. For example, pseudo-failure data representing an ink smudge corresponds to high-density pseudo-failure data, and pseudo-failure data representing a white streak corresponds to low-density pseudo-failure data.

In addition, in the present embodiment, in order to focus on a failure portion in an image upon determination by the image determination model, not only data corresponding to a determination target image (a print image which is a target for determining whether the print image is a good image or a failure image) but also data corresponding to an original image of the determination target image is provided as input data to the image determination model. Note that in this specification the term "determination target image" is not only used for an image that is provided to the image determination model upon determination, but is also used for an image that is provided to the image determination model upon learning.

In the above-described manner, an image determination model that can accurately determine whether a print image is a good image or a failure image is built. Then, using the built (learned) image determination model, a determination as to whether a determination target image is a good image or a failure image is made.

<4.2 Processing Procedure>

Figure 4:
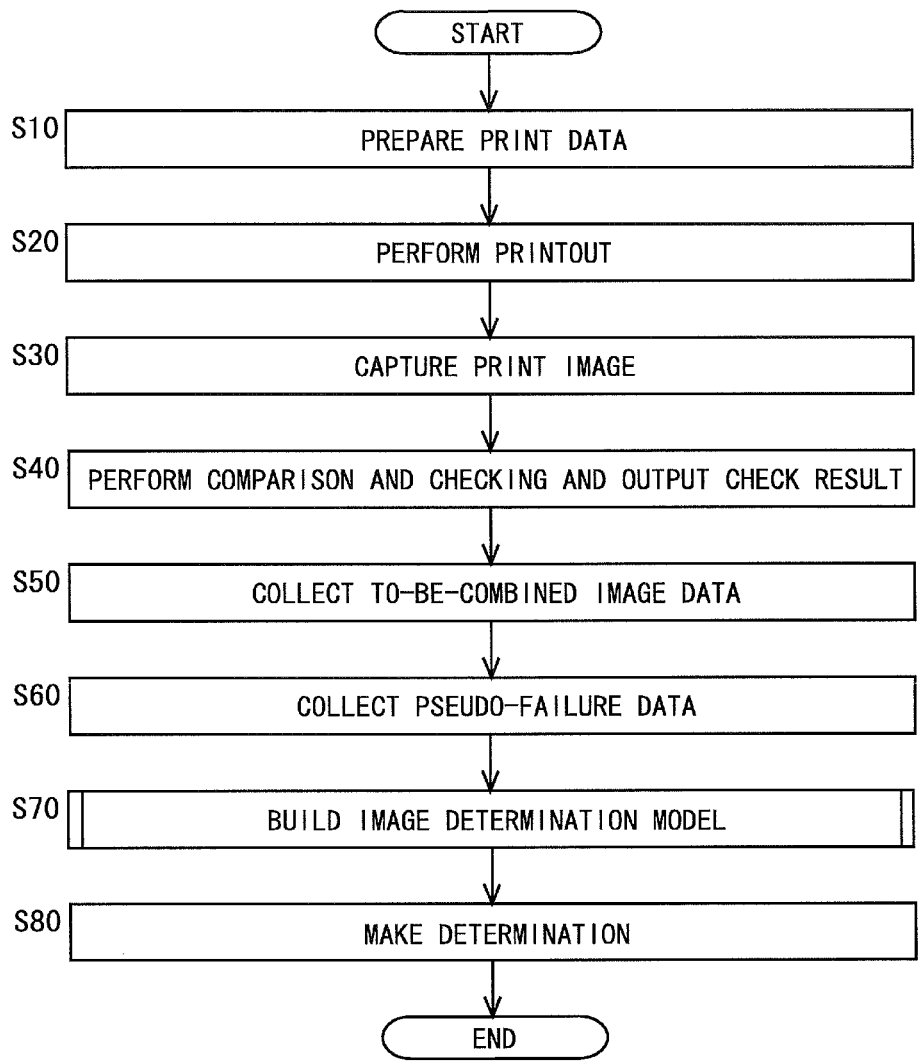
FIG. 4 is a flowchart showing an overall processing procedure in the embodiment.

FIG. 4 is a flowchart showing an overall processing procedure in the present embodiment. First, print data for performing printing by the inkjet printing device 100 is prepared (step S10). At this step S10, for example, the print data generating device 200 generates print data which is data in bitmap format by performing a RIP process on submitted data such as a PDF file.

Figure 5:
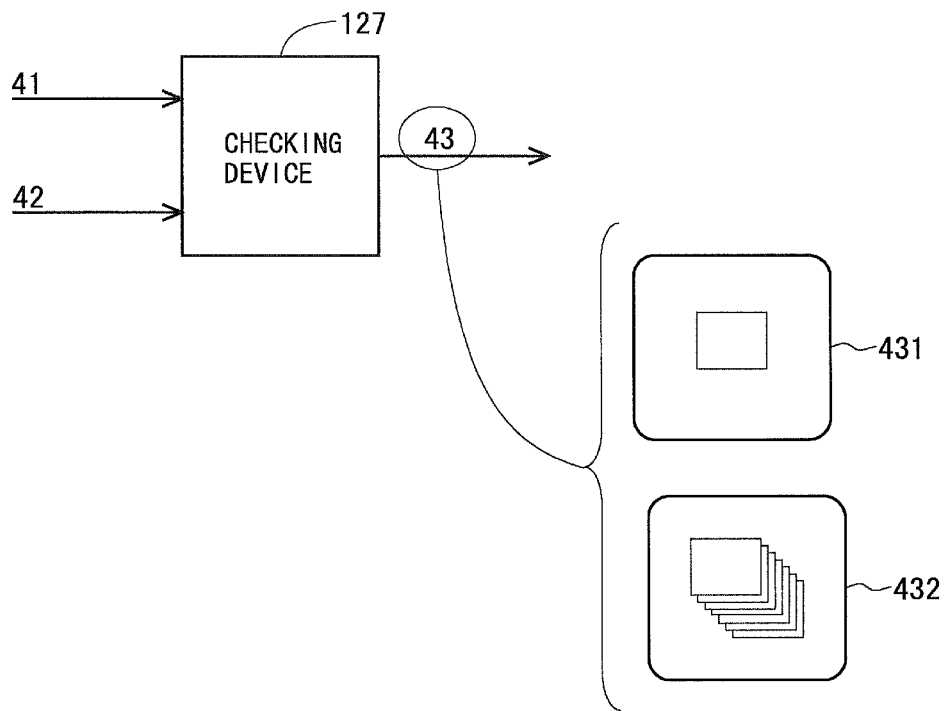
FIG. 5 is a diagram for describing operation of a checking device in the embodiment.

Subsequently, on the basis of the print data prepared at step S10, the inkjet printing device 100 performs a printout (step S20). Then, the checking device 127 checks a print image which is a result of the printout (step S30 and S40). At step S30, the print image is captured (read) by the camera included in the checking device 127. By this, captured-image data which is data in RGB format is obtained. At step S40, the checking device 127 compares and checks captured-image data 41 and data obtained by converting the print data to RGB format (hereinafter, print data in bitmap format and data obtained by converting the print data in bitmap format to RGB format are collectively referred to as "original-image data".) against each other, and outputs failure information 43 as a check result (see FIG. 5). The failure information 43 includes data 431 of an image which is a true failure (true-failure data) and data 432 of an image which is a false failure (false-failure data). Note that in order to obtain multiple pieces of false-failure data 432 (in other words, in order to determine some of pieces of data that are not determined to be print failures originally to be print failures), conditions for determination by the checking device 127 may be changed to different conditions than the original ones. The failure information 43 and the original-image data are sent from the checking device 127 to the print data generating device 200 as necessary.

The processes at the above-described step S10 to S40 are typically performed on a plurality of pieces of print data. That is, by repeating the processes at step S10 to S40, failure information 43 based on multiple print images is obtained.

After outputting the check results, to-be-combined image data which serves as data with which pseudo-failure data is to be combined at step S70 which will be described later is collected (step S50). At this step S50, data of print images that have not been determined to be print failures by checks performed by the checking device 127 and false-failure data included in the above-described failure information 43 are collected as to-be-combined image data. A determination as to whether data included in the failure information 43 is a true failure or a false failure is made by an operator's visual check. Note that data collected as to-be-combined image data is image data of a partial area among the entire print image (entire page).

Subsequently, the print data generating device 200 collects pseudo-failure data, on the basis of true-failure data included in the failure information 43 (step S60). Collection of pseudo-failure data is performed by, for example, the print data generating device 200 extracting only an ink smudge portion from within an image of true-failure data, using image editing software. Note that the color of a smudge in the extracted portion is mixed colors of the color of an ink that is a cause of the smudge and the color of a background (original image). Meanwhile, an image based on which true-failure data is obtained is a print image outputted from the inkjet printing device 100. That is, in the present embodiment, pseudo-failure data (smudge data) representing an ink smudge is image data extracted from a print image outputted from the inkjet printing device 100 in the past. Note that image data which is randomly generated using graphics creating means (a program that automatically creates graphics, etc.) may be used as pseudo-failure data.

Thereafter, an image determination model is built using the to-be-combined image data collected at step S50, the pseudo-failure data collected at step S60, etc. (step S70). Details of this step S70 will be described later.

Finally, using the image determination model build at step S70, a determination as to whether a determination target image is a good image or a failure image is made (step S80). At this time, captured-image data obtained by capturing the determination target image and original-image data representing an original image of the determination target image are provided as input data to the image determination model, and a determination result is outputted from the image determination model.

Note that in the present embodiment an image capturing step is implemented by step S30, a checking step is implemented by step S40, a model building step is implemented by step S70, and a determining step is implemented by step S80.

<5. Method for Building an Image Determination Model>

A method for building an image determination model according to the present embodiment will be described. Note that processes described here are performed by the print data generating device 200 executing the image determination model building program 241.

<5.1 Structure of an Image Determination Model>

Before describing a procedure for building an image determination model, a structure of the image determination model will be described. Note that the structure described here is an example and the present invention is not limited thereto.

Figure 6:
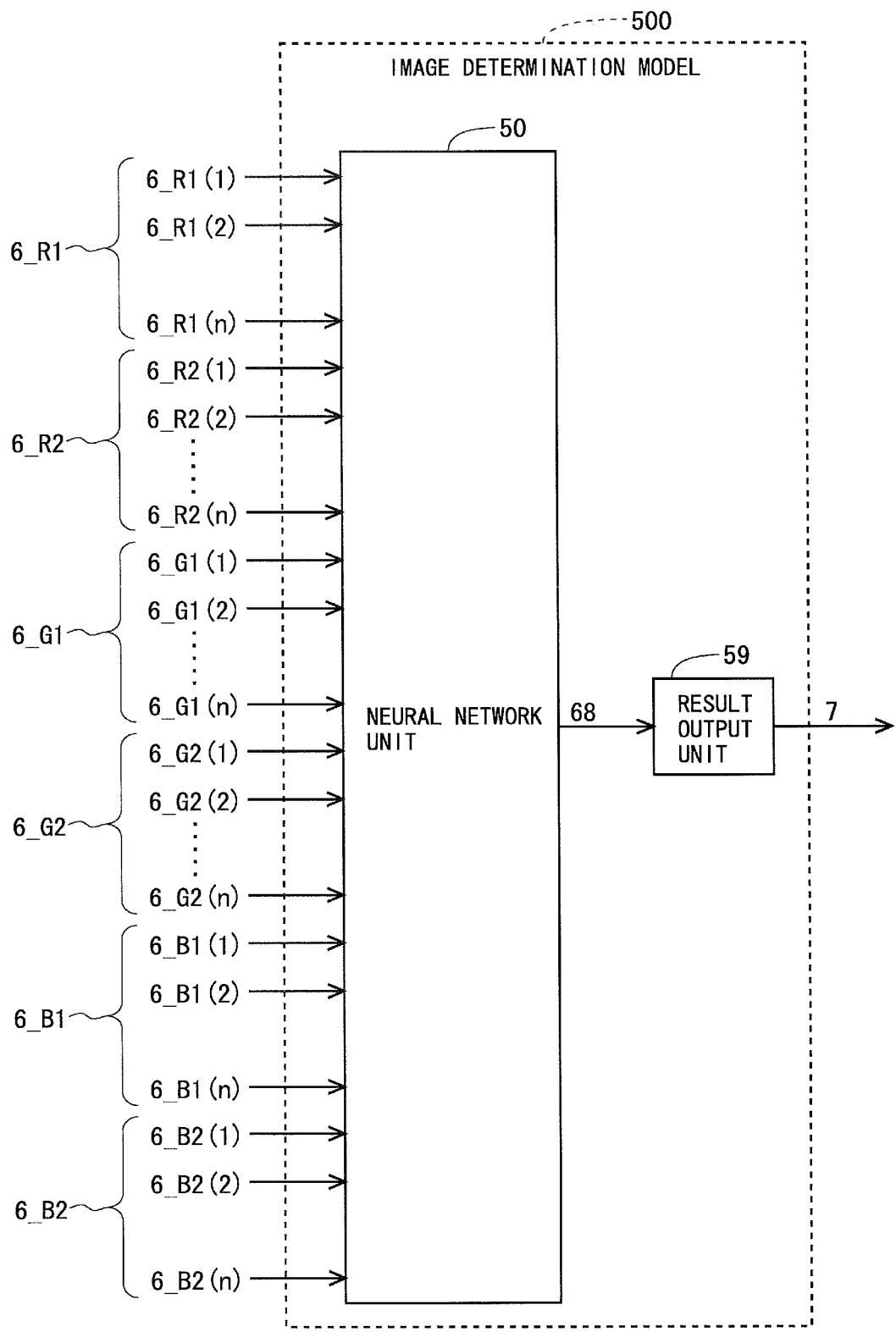
FIG. 6 is a schematic configuration diagram of an image determination model in the embodiment.

FIG. 6 is a schematic configuration diagram of an image determination model 500. As shown in FIG. 6, the image determination model 500 includes a neural network unit 50 that performs machine learning; and a result output unit 59 that outputs a determination result 7 indicating whether a determination target image is a good image or a failure image. In the present embodiment, the neural network unit 50 is implemented by a convolutional neural network.

To the neural network unit 50 is provided, as input data, "data which is a combination of captured-image data and original-image data" or "data which is a combination of data obtained by combining pseudo-failure data with captured-image data and original-image data". Note that the "captured-image data" and the "data obtained by combining pseudo-failure data with captured-image data" are hereinafter collectively referred to as "captured-image base data". The input data is data in RGB format, and input data for each color includes captured-image base data and original-image data. Therefore, specifically, as shown in FIG. 6, to the neural network unit 50 are provided, as input data, red captured-image base data 6_R1, red original-image data 6_R2, green captured-image base data 6_G1, green original-image data 6_G2, blue captured-image base data 6_B1, and blue original-image data 6_B2.

As described above, six-channel data is inputted to the neural network unit 50. Each channel data includes n pixel value data (n is plural). For example, the red captured-image base data 6_R1 includes, as shown in FIG. 6, n pixel value data 6_R1(1) to 6_R1($n$). From the above, (6×n) pixel value data is inputted to the neural network unit 50.

Although data of a single six-channel image is provided to the image determination model 500 in this example, the configuration may be such that data of two three-channel images is provided to the image determination model 500, and data obtained by converting the data of two three-channel images to data of a single six-channel image in the image determination model 500 is inputted to the neural network unit 50.

Note that the size of a cut image based on which the input data is obtained does not always match the size of each channel data in the neural network unit 50. Therefore, in a case in which there is a size mismatch, data whose size is allowed to match by performing size conversion on original data of input data serves as input data to the neural network unit 50.

Figure 7:
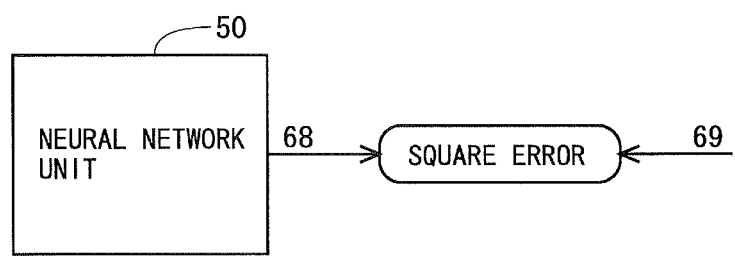
FIG. 7 is a diagram for describing a process performed upon learning in the embodiment.

The neural network unit 50 outputs determination data 68 for determining whether an image of captured-image base data is a good image or a failure image. The determination data 68 is numerical value data between 0 and 1, inclusive. Upon learning, the values of parameters used by the neural network unit 50 (convolutional neural network) are updated by a backpropagation process based on a difference (typically, square error) (see FIG. 7) between the value of the determination data 68 and the value of correct data 69 (e.g., the value of correct data corresponding to a failure image is 1 and the value of correct data corresponding to a good image is 0). Upon determination, for example, when the value of the determination data 68 is 0.5 or more, a determination result 7 indicating that the determination target image is a failure image is outputted from the result output unit 59, and when the value of the determination data 68 is less than 0.5, a determination result 7 indicating that the determination target image is a good image is outputted from the result output unit 59.

Figure 8:
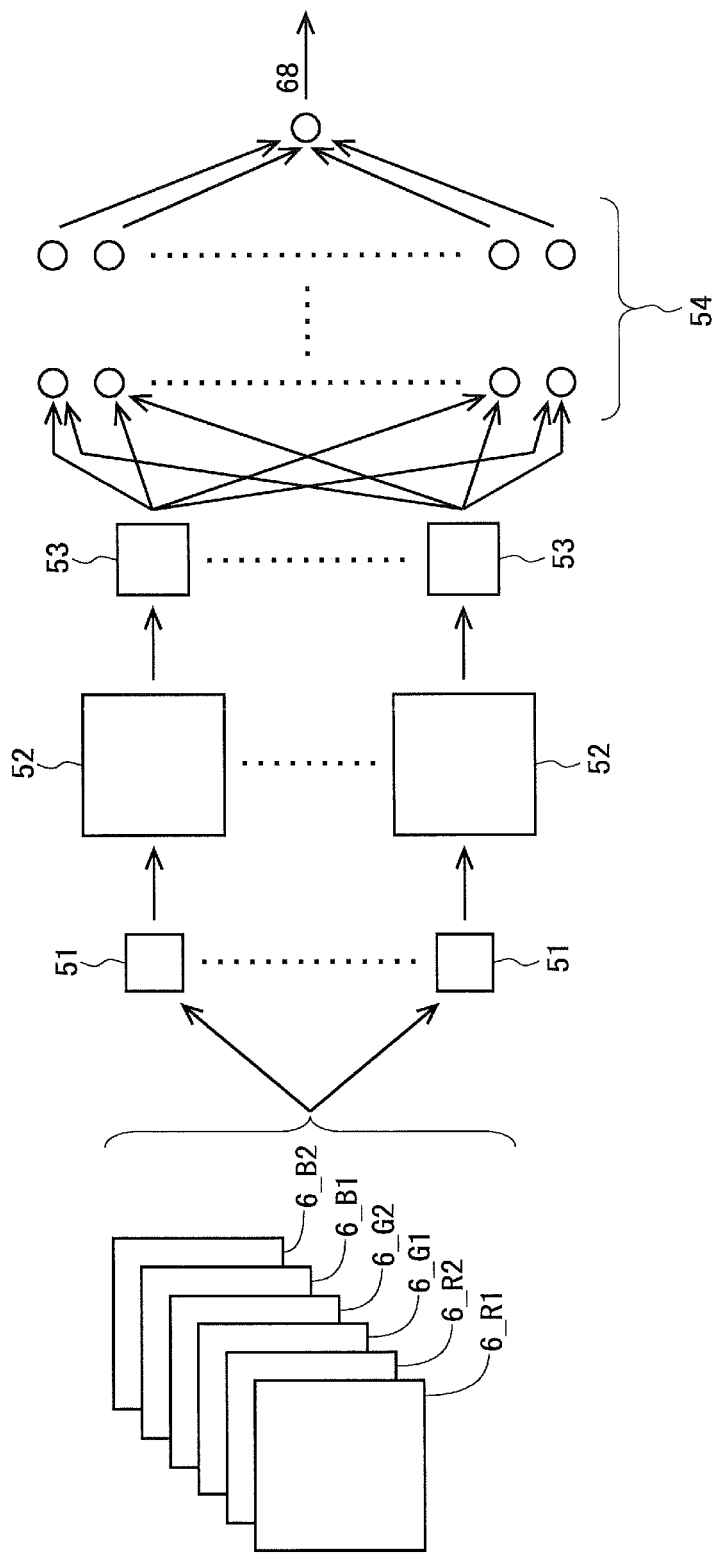
FIG. 8 is a diagram showing an example of a detailed configuration of a neural network unit in the image determination model in the embodiment.

FIG. 8 is a diagram showing an example of a detailed configuration of the neural network unit 50 in the image determination model 500. When the above-described six-channel data (the red captured-image base data 6_R1, the red original-image data 6_R2, the green captured-image base data 6_G1, the green original-image data 6_G2, the blue captured-image base data 6_B1, and the blue original-image data 6_B2) is inputted to the neural network unit 50, convolutional operation based on a single set or a plurality of sets of convolutional filters 51 is performed on the input data. Note that a single set of convolutional filters 51 includes six filters, and a single feature map 52 is obtained by convolutional operation based on a single set of convolutional filters 51. For example, in a case in which three sets of convolutional filters 51 are used, three feature maps 52 are obtained by convolutional operation. Then, by performing pooling operation on each feature map 52, pooling data 53 with reduced dimensions is obtained. The pooling data 53 thus obtained is provided to a fully-connected layer 54, and the above-described determination data 68 is outputted from the fully-connected layer 54. On the basis of the value of the determination data 68, as described above, the parameters are updated upon learning, and a determination result 7 for a determination target image is outputted upon determination.

<5.2 Procedure>

Figure 9:
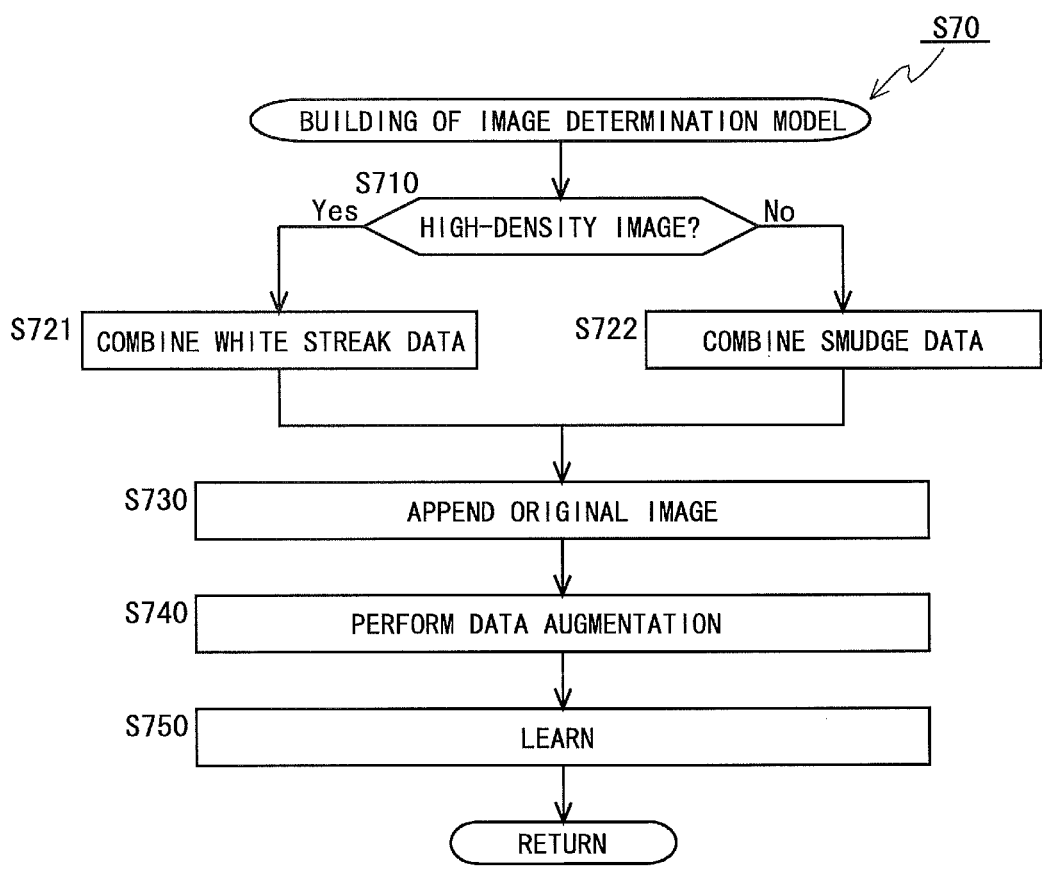
FIG. 9 is a flowchart showing a procedure for building an image determination model in the embodiment.

FIG. 9 is a flowchart showing a procedure for building an image determination model 500 (a procedure of the process at step S70 in FIG. 4). As described above, in the present embodiment, a process of generating teaching data (first teaching data) corresponding to failure images is performed. This process is performed by combining pseudo-failure data with captured-image data as the to-be-combined image data. Regarding this, it is desirable that the first teaching data be data close to failure images to be actually detected by the checking device 127. For example, the checking device 127 determines a portion with an ink smudge present on a background having ink lightly applied thereto or a portion with missing ink present on a background having ink heavily applied thereto, to be a failure portion.

Hence, in order that pseudo-failure data which is combined with captured-image data varies depending on the ink density of the background, first, a determination is made as to whether a partial image (determination target image) of a print image used for learning, with which pseudo-failure data is combined, is a high-density image or a low-density image (step S710). At this step S710, a determination as to whether the determination target image is a high-density image or a low-density image is made on the basis of captured-image data corresponding to the determination target image. Note, however, that the determination may be made on the basis of original-image data corresponding to the determination target image. Since the captured-image data is data in RGB format, an average value of pixel values constituting the captured-image data is determined for each of the RGB colors. That is, three average values (an average red value AVE_R, an average green value AVE_G, and an average blue value AVE_B) are determined. Then, the three average values are compared with respective predetermined threshold values, and a determination as to whether the determination target image is a high-density image or a low-density image is made by whether a predetermined condition is satisfied. For example, three threshold values (a red threshold value TH_R, a green threshold value TH_G, and a blue threshold value TH_B) are prepared for the above-described three average values, respectively, and if all of the following expressions (1) to (3) are satisfied, then the determination target image is determined to be a high-density image, or otherwise, the determination target image is determined to be a low-density image:

$$AVE\_R < TH\_R \quad (1)$$

$$AVE\_G < TH\_G \quad (2)$$

$$AVE\_B < TH\_B \quad (3)$$

Note, however, that a technique for determining whether the determination target image is a high-density image or a low-density image is not limited to the above-described one, and the determination may be made by other techniques. For example, a determination as to whether the determination target image is a high-density image or a low-density image may be made on the basis of print image data which is used when the determination target image is printed.

If it is determined at step S710 that the determination target image is a high-density image, processing proceeds to step S721. On the other hand, if it is determined at step S710 that the determination target image is a low-density image, processing proceeds to step S722.

Figure 10:
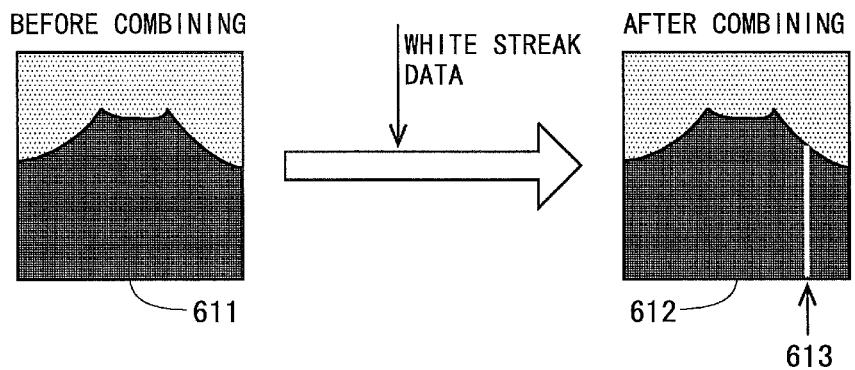
FIG. 10 is a diagram for describing combining of white streak data with captured-image data in the embodiment.

At step S721, by combining white streak data which is pseudo-failure data with the captured-image data, first teaching data is generated. At this step S721, for example, as shown in FIG. 10, white streak data is combined with captured-image data 611, by which first teaching data 612 including white streak data 613 is generated. Meanwhile, as described above, a white streak is caused by missing ink upon printing. In addition, as shown in FIG. 2, the printing unit 125 of the inkjet printing device 100 according to the present embodiment includes the C inkjet head 125c, the M inkjet head 125m, the Y inkjet head 125y, and the K inkjet head 125k. Therefore, combining of white streak data is performed by removing a component of at least one color among CMYK (typically, a component of one color component) from the captured-image data. However, the captured-image data is data in RGB format. Therefore, at step S721, prior to combining of data, by converting the RGB values of the captured-image data to CMYK values, which ink color components are included in the captured-image data are estimated. Then, only components of the ink color included in the captured-image data serve as a target of removal from the captured-image data. Note that which ink color components among CMYK are included in the captured-image data may be directly estimated from the RGB values. Regarding this, as an example, since C (cyan) and R (red) have a complementary color (opposite color) relationship, if R is a little, then it can be estimated that a C ink is used a lot.

By combining white streak data in the above-described manner, generation of first teaching data including white streak data (data of a failure image) that cannot occur in practice is prevented. That is, generation of first teaching data that becomes noise upon learning is prevented.

Figure 11:
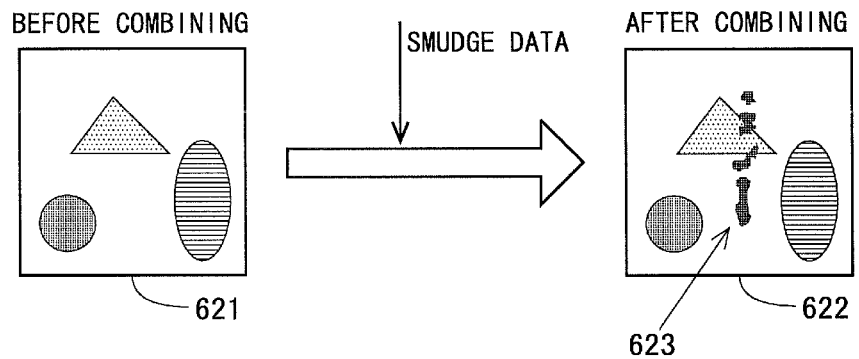
FIG. 11 is a diagram for describing combining of smudge data with captured-image data in the embodiment.

At step S722, by combining smudge data which is pseudo-failure data with the captured-image data, first teaching data is generated. The smudge data is prepared in advance at step S60 in FIG. 4. At this step S722, for example, as shown in FIG. 11, smudge data is combined with captured-image data 621, by which first teaching data 622 including smudge data 623 is generated.

Note that although first teaching data is generated by combining pseudo-failure data with captured-image data in the present embodiment, the configuration is not limited thereto. First teaching data can also be generated by combining pseudo-failure data with original-image data. That is, using captured-image data or original-image data as to-be-combined image data, pseudo-failure data is combined with the to-be-combined image data, by which first teaching data is generated. In addition, for second teaching data, for example, captured-image data that is before being combined with pseudo-failure data at step S721 and S722 can be used.

Meanwhile, a print image based on which first teaching data is generated (a partial image of a print image used for learning, with which pseudo-failure data is combined) is selected by an operator. On the basis of the selected print image, the processes at steps S710, S721, and S722 are performed without through operator's operations. That is, first teaching data is automatically generated.

At step S730, a process of appending original-image data to teaching data (first teaching data and second teaching data) used for learning at step S750 which will be described later is performed. A reason that such a process is performed is to, as described above, focus on a failure portion in an image upon determination by the image determination model 500.

Then, a process called data augmentation is performed on the teaching data (step S740). Specifically, by performing a transformation process such as inverting, zooming-in, and zooming-out on images of teaching data present at the time of starting this step S740, the number of pieces of teaching data is increased. Note that the process at this step S740 is not necessarily required, but by thus increasing the number of pieces of teaching data, an advantageous effect of improving robustness is obtained.

Typically, the processes at step S710 to S740 are repeated a number of times corresponding to the number of pieces of to-be-combined image data collected at step S50 in FIG. 4. By this, multiple pieces of first teaching data used for learning are generated.

Thereafter, by sequentially providing the teaching data (first teaching data and second teaching data) to the neural network unit 50, learning (machine learning) is performed (step S750). By this, the parameters of the neural network unit 50 are optimized, and an image determination model 500 is built.

Note that, in the present embodiment, a density determining step is implemented by step S710, a teaching data generating step is implemented by step S721 and S722, an original-image appending step is implemented by step S730, and a learning step is implemented by step S750.

<5.3 Combining of Pseudo-Failure Data>
<5.3.1 Combining Using Random Numbers>

Combining of pseudo-failure data with captured-image data will be described. In the present embodiment, in regard to combining of high-density pseudo-failure data with captured-image data, combining in various modes using random numbers is repeatedly performed. For example, in regard to combining of smudge data which is high-density pseudo-failure data, a combining location, the color of smudge data to be combined, a mode of gradation of smudge data to be combined, etc., are determined using random numbers.

Figure 12:
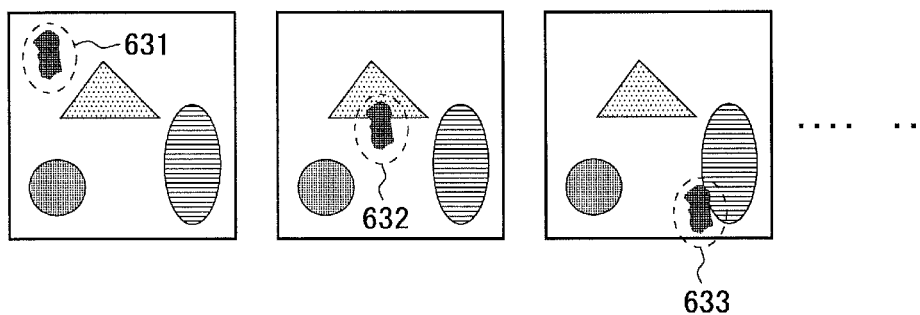
FIG. 12 is a diagram for describing determination of a combining location of smudge data using random numbers in the embodiment.

By determining a combining location of smudge data using random numbers, there are generated, for example, first teaching data in which smudge data is added at a location given reference sign 631 in FIG. 12, first teaching data in which smudge data is added at a location given reference sign 632 in FIG. 12, and first teaching data in which smudge data is added at a location given reference sign 633 in FIG. 12.

Figure 13:
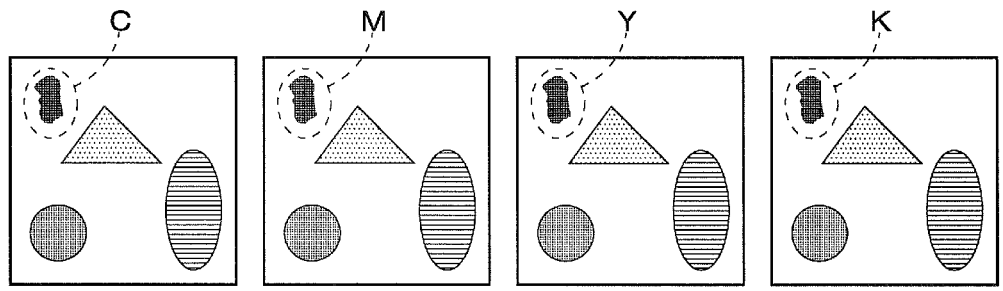
FIG. 13 is a diagram for describing determination of the color of smudge data to be combined, using random numbers in the embodiment.

By determining the color of smudge data to be combined using random numbers, there are generated first teaching data in which smudge data of C color is added, first teaching data in which smudge data of M color is added, first teaching data in which smudge data of Y color is added, and first teaching data in which smudge data of K color is added (see FIG. 13).

Figure 14:
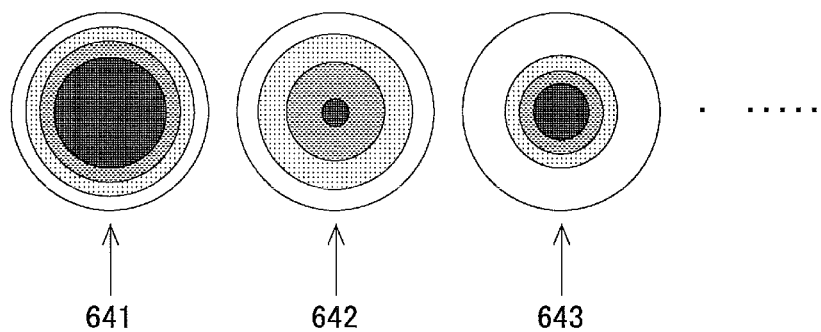
FIG. 14 is a diagram for describing determination of a mode of gradation of smudge data to be combined, using random numbers in the embodiment.

By determining a mode of gradation of smudge data to be combined using random numbers, there are generated first teaching data in which smudge data having gradation indicated by an arrow given reference sign 641 in FIG. 14 is added, first teaching data in which smudge data having gradation indicated by an arrow given reference sign 642 in FIG. 14 is added, first teaching data in which smudge data having gradation indicated by an arrow given reference sign 643 in FIG. 14 is added, etc. Note that, regarding the gradation of smudge data, normally, density increases as it gets closer to the center, and gradually decreases as it moves further away from the center, and thus, it is desirable to set the probability of appearance of smudge data such that a high-density smudge image appears with higher probability as it gets closer to the center of the smudge data.

As described above, the processes at step S710 to S740 in FIG. 9 are repeated a number of times corresponding to the number of pieces of to-be-combined image data. Therefore, a process of combining high-density pseudo-failure data (smudge data) having attributes that are determined using random numbers with captured-image data which is to-be-combined image data is repeated, and multiple pieces of first teaching data including various "combinations of a background image and a failure image" are generated.

Note that a plurality of pieces of first teaching data may be generated from a single piece of to-be-combined image data by repeating a process of combining pseudo-failure data having attributes that are determined using random numbers with to-be-combined image data (captured-image data in the present embodiment) in a single process at the above-described step S721 or a single process at the above-described step S722.

<5.3.2 Specific Example of Combining Logic>

Now, a specific example of logic for combining pseudo-failure data with captured-image data will be described. Here, a case of combining smudge data of C color with captured-image data is focused on. Note that it is assumed that RGB values in each state are as follows:

$$R_{paper\_white} = 200$$

$$G_{paper\_white} = 200$$

$$B_{paper\_white} = 200$$

$R_{paper\_white}$, $G_{paper\_white}$, and $B_{paper\_white}$ are the R value, G value, and B value of paper white (printing paper with no inks applied thereto), respectively.

$$R_{cyan} = 30$$

$$G_{cyan} = 60$$

$$B_{cyan} = 140$$

$R_{cyan}$, $G_{cyan}$, and $B_{cyan}$ are the R value, G value, and B value in a state in which a C ink is applied to paper white with a dot percentage of 100%, respectively.

A ratio $R_{ink\_rate\_100}$ of the "R value obtained when a C ink is applied to paper white with a dot percentage of 100%" to the "R value of paper white" is determined by the following equation (4):

$$R_{ink\_rate\_100} = R_{cyan}/R_{paper\_white} \qquad (4)$$
$$= 30/200$$
$$= 0.15$$

A ratio $G_{ink\_rate\_100}$ of the "G value obtained when a C ink is applied to paper white with a dot percentage of 100%" to the "G value of paper white" is determined by the following equation (5):

$$G_{ink\_rate\_100} = G_{cyan}/G_{paper\_white} \qquad (5)$$
$$= 60/200$$
$$= 0.3$$

A ratio $B_{ink\_rate\_100}$ of the "B value obtained when a C ink is applied to paper white with a dot percentage of 100%" to the "B value of paper white" is determined by the following equation (6):

$$B_{ink\_rate\_100} = B_{cyan}/B_{paper\_white} \qquad (6)$$
$$= 140/200$$
$$= 0.7$$

A ratio $R_{ink\_rate\_0}$ of an "R value obtained when it is presumed that a C ink is applied to paper white with a dot percentage of 0%" to the "R value of paper white" is 1.0, a ratio $G_{ink\_rate\_0}$ of a "G value obtained when it is presumed that a C ink is applied to paper white with a dot percentage of 0%" to the "G value of paper white" is 1.0, and a ratio $B_{ink\_rate\_0}$ of a "B value obtained when it is presumed that a C ink is applied to paper white with a dot percentage of 0%" to the "B value of paper white" is 1.0.

Under the above-described premises, calculation of the following equations (7) to (13) is performed on each pixel data of captured-image data. In other words, calculation of the following equations (7) to (13) is repeated a number of times corresponding to the number of pixels constituting smudge data.

First, ink density $RGB_{ink\_density}$ is determined by the following equation (7) using random numbers. Note that "random. randrange (arg1, arg2, arg3)" is a function that returns a random number in arg3 increments in a range between arg1 and arg2, inclusive.

$$RGB_{ink\_density} = \frac{\text{random } randrange(0, 100, 1)}{100} \qquad (7)$$

Then, R ink density $R_{ink\_density}$, G ink density $G_{ink\_density}$, and B ink density $B_{ink\_density}$ are determined by the following equations (8) to (10):

$$\begin{aligned}R_{ink\_density} &= R_{ink\_rate\_0} - ((R_{ink\_rate\_0} - R_{ink\_rate\_100}) \times \\ & \quad RGB_{ink\_density}) \\ &= 1.0 - ((1.0 - 0.15) \times RGB_{ink\_density}) \\ &= 1.0 - 0.85 \times RGB_{ink\_density}\end{aligned} \qquad (8)$$

$$\begin{aligned}G_{ink\_density} &= G_{ink\_rate\_0} - ((G_{ink\_rate\_0} - G_{ink\_rate\_100}) \times \\ & \quad RGB_{ink\_density}) \\ &= 1.0 - ((1.0 - 0.3) \times RGB_{ink\_density}) \\ &= 1.0 - 0.7 \times RGB_{ink\_density}\end{aligned} \qquad (9)$$

$$\begin{aligned}B_{ink\_density} &= B_{ink\_rate\_0} - ((B_{ink\_rate\_0} - B_{ink\_rate\_100}) \times \\ & \quad RGB_{ink\_density}) \\ &= 1.0 - ((1.0 - 0.7) \times RGB_{ink\_density}) \\ &= 1.0 - 0.3 \times RGB_{ink\_density}\end{aligned} \qquad (10)$$

Finally, an R value $R_{pixel\_new}$ after combining, a G value $G_{pixel\_new}$ after combining, and a B value $B_{pixel\_new}$ after combining are determined by the following equations (11) to (13). Note that $R_{pixel}$, $G_{pixel}$, and $B_{pixel}$ are the R value, G value, and B value of a processing target pixel in the captured-image data, respectively.

$$R_{pixel\_new} = R_{pixel} \times R_{ink\_density} \qquad (11)$$

$$G_{pixel\_new} = G_{pixel} \times G_{ink\_density} \qquad (12)$$

$$B_{pixel\_new} = B_{pixel} \times B_{ink\_density} \qquad (13)$$

Although here the case of combining smudge data of C color with captured-image data is described as an example, the same logic can also be used for a case of combining smudge data of other colors (M, Y, and K) than C color with captured-image data.

<5.4 Appending Original-Image Data to Teaching Data>

Next, a process of appending original-image data to teaching data (first teaching data and second teaching data) (the process at step S730 in FIG. 9) will be described in detail.

In a case in which an artificial intelligence model such as the image determination model 500 in the present embodiment is allowed to learn images, there is a problem that data printed by the inkjet printing device 100 is variable data. Since variable data is used, even if an ink smudge occurs in a plurality of pieces of paper, normally, a background varies from paper to paper. In addition, an ink smudge also varies in shape and color. Due to this, even if the artificial intelligence model is allowed to learn images, the learning may not be performed focusing on ink smudges. For example, a specific design on a background may be focused on, resulting in making a true-failure determination despite the fact that it is not a true failure. According to the conventional technique, the background thus greatly affects learning results, and a distinction between an ink smudge or a white streak which are true failures and an image that is not a true failure is not accurately made.

Figure 15:
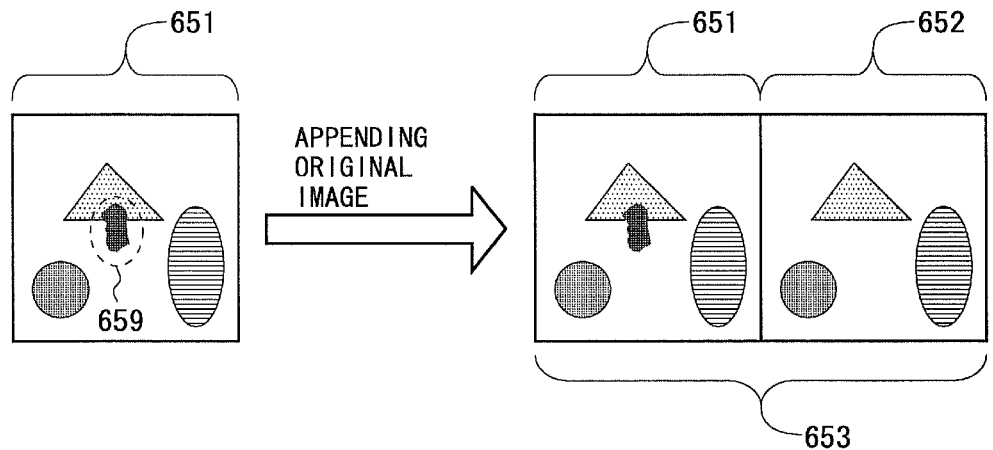
FIG. 15 is a diagram for describing appending original-image data to teaching data in the embodiment.

Hence, in the present embodiment, as described above, in order for the image determination model 500 to make a determination focusing on a failure portion in an image, not only data corresponding to a determination target image, but also original-image data of the determination target image is provided as input data to the image determination model 500. That is, prior to learning, a process of appending an original image to a determination target image is performed. The process is performed for both first teaching data and second teaching data. In the present embodiment, first teaching data is generated by combining pseudo-failure data with captured-image data. Therefore, appending original-image data to first teaching data is performed by, as shown in FIG. 15, appending original-image data 652 to captured-image base data 651 which is data obtained by combining pseudo-failure data 659 with captured-image data. In this manner, input data 653 to the image determination model 500 is obtained. Note that appending original-image data to second teaching data is performed by appending the original-image data to captured-image base data which is captured-image data itself. In the above-described manner, the background is prevented from affecting learning results.

Figure 16:
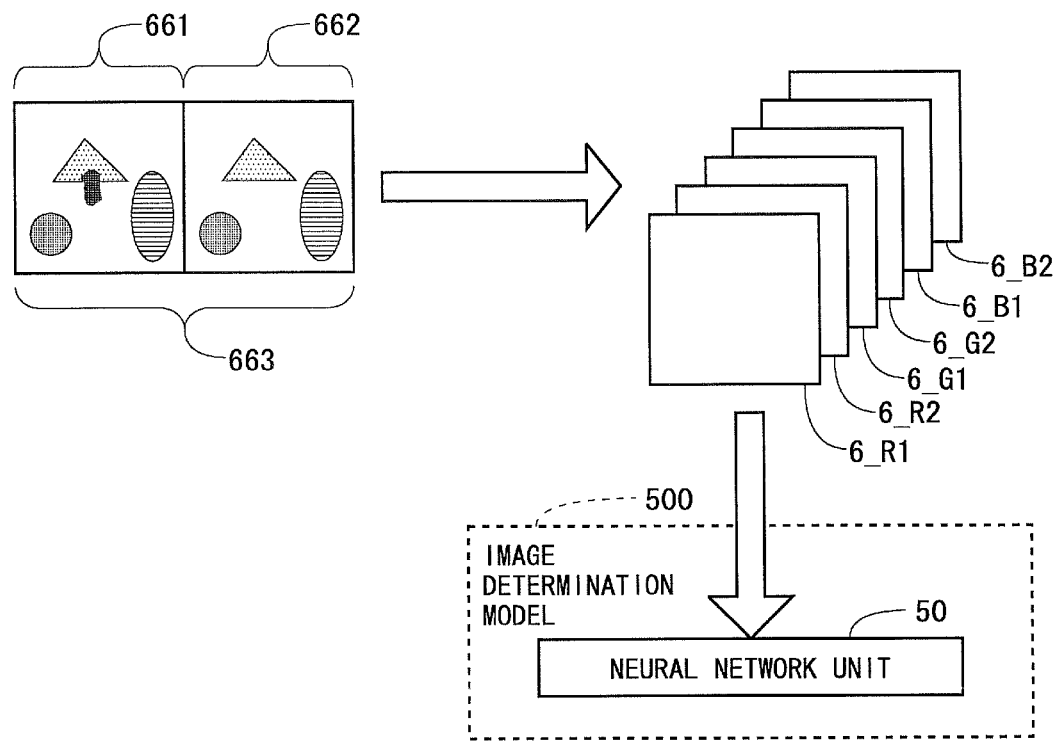
FIG. 16 is a diagram for describing input data in which original-image data is appended to captured-image base data (input data to the image determination model) in the embodiment.

As shown in FIG. 16, input data 663 obtained by appending original-image data 662 to captured-image base data 661 is given to the neural network unit 50 in the image determination model 500, as six-channel data including red captured-image base data 6_R1, red original-image data 6_R2, green captured-image base data 6_G1, green original-image data 6_G2, blue captured-image base data 6_B1, and blue original-image data 6_B2.

By learning original-image data corresponding to a print image to be actually obtained to teaching data in the above-described manner, it enables to perform learning (learning by the image determination model 500) while focusing on a difference between a determination target image and an original image.

Note that although original-image data of a determination target image is appended to teaching data in the present embodiment, instead of the original-image data itself, data equivalent to the original-image data may be appended to the teaching data. In regard to printing using variable data, printing of images in which variable data is placed only in a partial region of a specific background may be performed. In such a case, even if original-image data of a print image that differs from a determination target image based on which teaching data is obtained is appended to teaching data, it is presumed that learning is performed focusing on a failure portion in an image. Thus, data to be appended to teaching data is not limited to original-image data of a determination target image itself.

<6. Advantageous Effects>
<6.1 Comparison with the Conventional Technique, Etc.>

Figure 17:
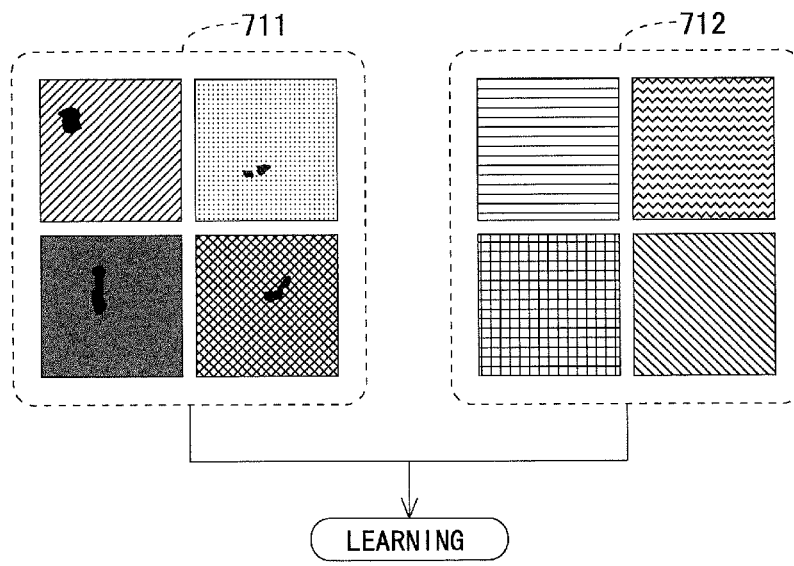
FIG. 17 is a diagram for describing determination in a conventional technique.

According to the conventional technique utilizing artificial intelligence technology, as shown in FIG. 17, there is no association between true-failure data 711 which is teaching data and false-failure data 712 which is teaching data. That is, differences between the true-failure data 711 and the false-failure data 712 include not only whether there is a failure portion (an ink smudge, a white streak, etc.) but also a difference in background. Due to this, it is difficult for an artificial intelligence model to learn while identifying a failure portion in an image. Hence, there is a high frequency of obtaining erroneous determination results without focusing on a failure portion upon determination.

Figure 18:
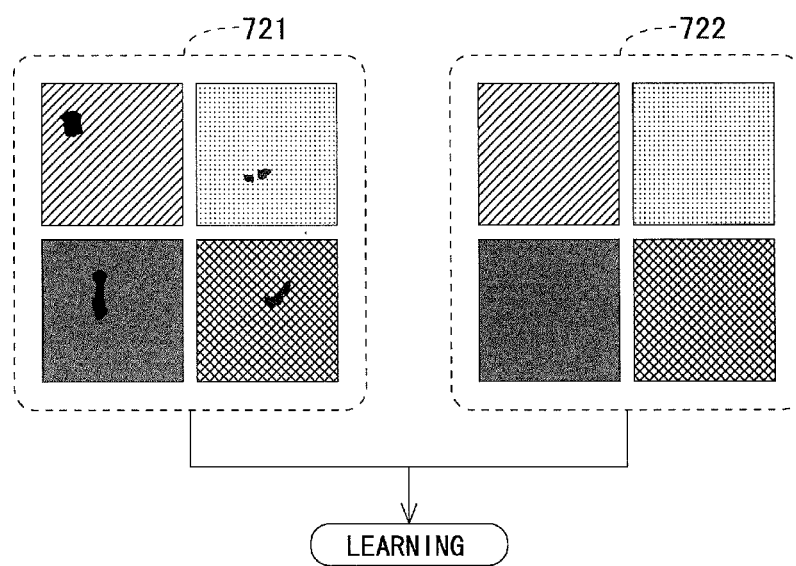
FIG. 18 is a diagram for describing determination for a case of adopting a configuration in which first teaching data is generated by combining pseudo-failure data with captured-image data.

By adopting a configuration in which first teaching data is generated by combining pseudo-failure data with captured-image data, it is possible to prepare a sufficient number of pieces of true-failure data (first teaching data), and as shown in FIG. 18, it is possible to make only whether there is a failure portion to be a difference between true-failure data 721 and false-failure data 722. By this, compared to the conventional technique, determination accuracy improves. Note, however, that unless appending original-image data to teaching data is performed prior to learning, it is difficult for the artificial intelligence model to obtain the correct determination result for an unknown failure image.

Figure 19:
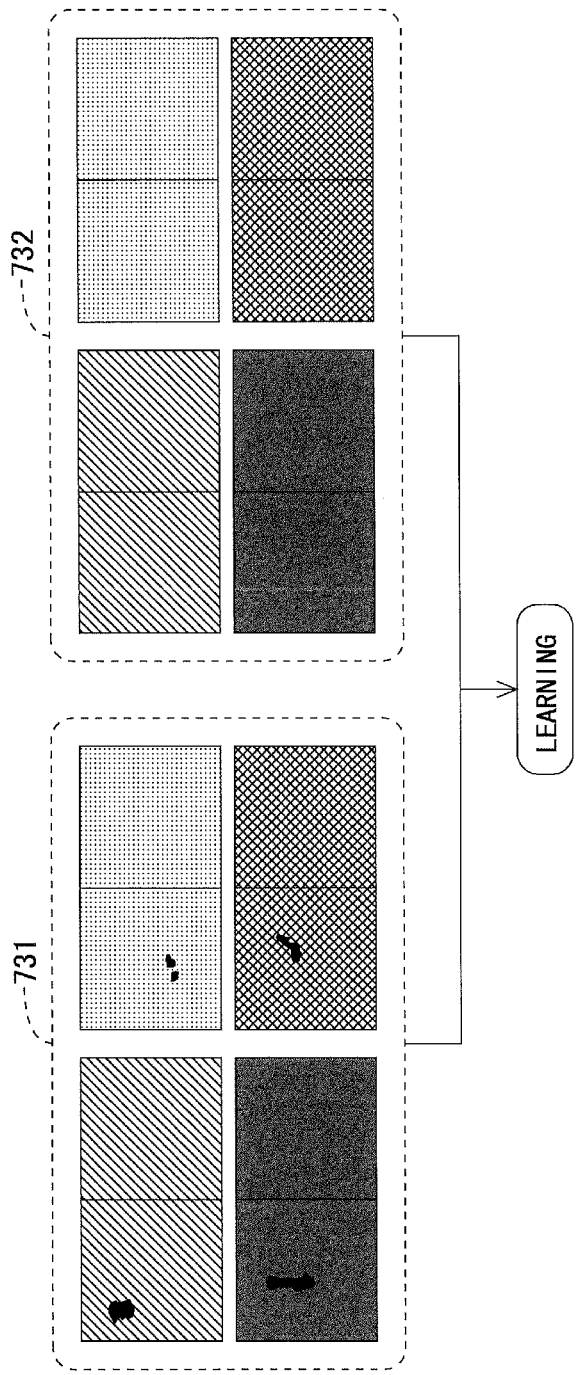
FIG. 19 is a diagram for describing determination in the embodiment.
Figure 20:
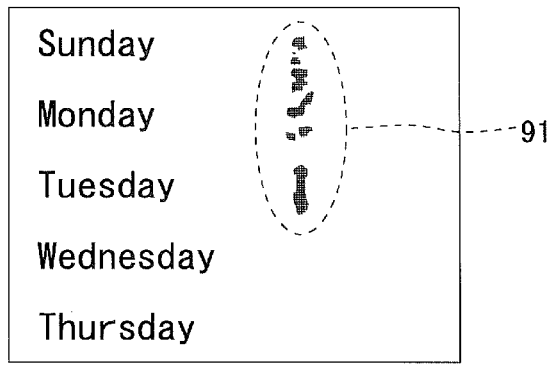
FIG. 20 is a diagram for describing ink smudges.
Figure 21:
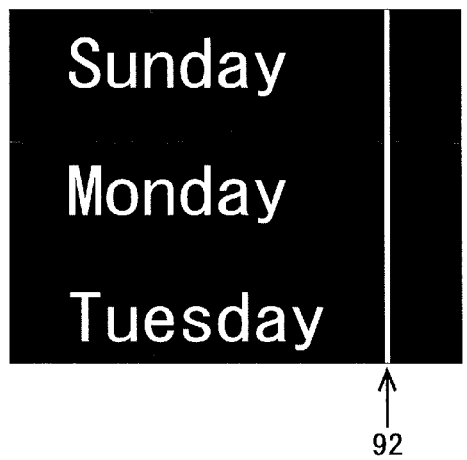
FIG. 21 is a diagram for describing a white streak.
Figure 22:
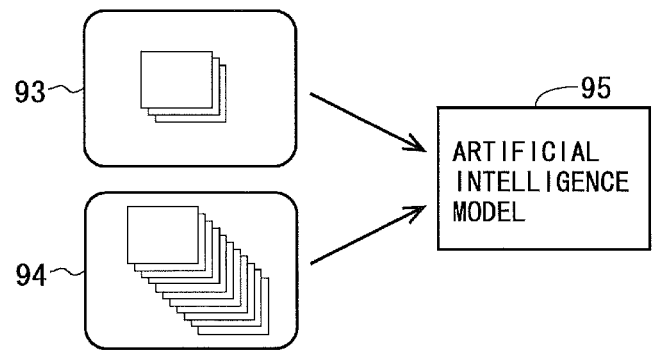
FIG. 22 is a diagram for describing a conventional technique utilizing artificial intelligence technology.
Figure 23:
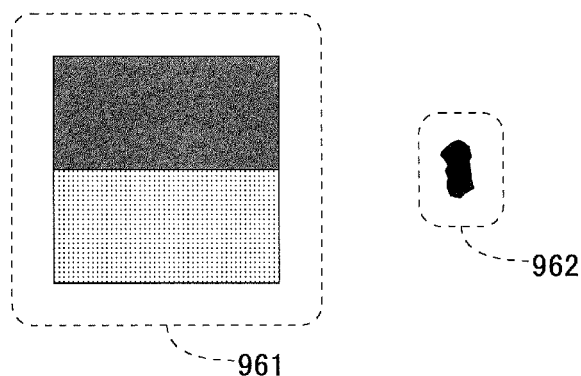
FIG. 23 is a diagram for describing that in conventional art a background is not taken into account upon distinguishing between a true failure and a false failure.
Figure 24:
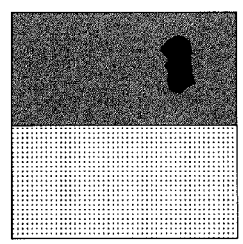
FIG. 24 is a diagram for describing that in the conventional art the background is not taken into account upon distinguishing between a true failure and a false failure.
Figure 25:
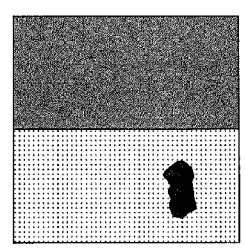
FIG. 25 is a diagram for describing that in the conventional art the background is not taken into account upon distinguishing between a true failure and a false failure.

According to the present embodiment, there are adopted a configuration in which first teaching data is generated by combining pseudo-failure data with captured-image data and a configuration in which original-image data is appended to teaching data prior to learning. By this, as shown in FIG. 19, it is possible to make only whether there is a failure portion to be a difference between true-failure data 731 and false-failure data 732. In addition, upon learning, a difference between a determination target image and an original image is focused on, and learning can be performed while a failure portion in an image is identified. Hence, robustness about determination (a distinction between a true failure and a false failure) of an unknown failure image improves.

<6.2 Summary>

Advantageous effects obtained in the present embodiment are summarized below. First, by combining pseudo-failure data with captured-image data, first teaching data which is teaching data corresponding to a failure image is generated. By this, even if the frequency of occurrence of actual print failures is low, a sufficient number of pieces of first teaching data can be prepared. Therefore, compared to the conventional technique, a distinction between a true failure and a false failure can be accurately made. In addition, by generating first teaching data as described above, a difference between a print image including true-failure data and a print image including false-failure data can be only whether there is a failure portion, and thus, learning is performed while focusing on a failure portion, improving determination accuracy. Furthermore, since original-image data is appended to teaching data prior to learning, a background is taken into account upon distinguishing between a true failure and a false failure. In other words, the background is prevented from greatly affecting learning results. As a result, a distinction between a true failure and a false failure can be made with sufficient accuracy. By the above, according to the present embodiment, a determination as to whether a print image outputted from the inkjet printing device 100 is a failure image (true-failure image) can be made with sufficient accuracy.

<7. Others>

Although the present invention is described in detail above, the above description is to be considered in all respects as illustrative and not restrictive. It is to be understood that multiple other changes and modifications can be made without departing from the true spirit and scope of the present invention.

For example, although a distinction between a true failure and a false failure is made by the print data generating device 200 that generates print data in the above-described embodiment, the present invention is not limited thereto. A distinction between a true failure and a false failure may be made by other devices than the print data generating device 200.

In addition, although captured-image base data and the original-image data are provided to the image determination model 500 after a process of appending original-image data to teaching data (first teaching data and second teaching data) (the process at step S730 in FIG. 9) is performed in the above-described embodiment, the present invention is not limited thereto. Though determination accuracy decreases compared to the above-described embodiment, it is also possible to provide only captured-image base data to the image determination model 500 without performing the process of appending original-image data. In this case, too, by performing a process of generating first teaching data by combining pseudo-failure data with captured-image data, a sufficient number of pieces of first teaching data can be prepared, and thus, the accuracy of distinction between a true failure and a false failure improves compared to the conventional technique.

Note that this application claims priority based on Japanese Patent Application No. 2019-119420 filed on Jun. 27, 2019 and entitled "Method for Building Image Determination Model, Image Determination Model, and Image Determination Method", the content of which is incorporated herein by reference.

What is claimed is:

1. A method for building an image determination model that determines whether a print image outputted to a printing medium from a printing device is a good image or a failure image, the method comprising:
   a density determining step of determining whether the print image is a high-density image or a low-density image, on a basis of captured-image data or original-image data representing an original image of the print image, the captured-image data being obtained by capturing the print image on the printing medium;
   a teaching data generating step of generating first teaching data by combining pseudo-failure data with to-be-combined image data, based on a result of the determination in the density determining step, the captured-image data or the original-image data serving as the to-be-combined image data, and the first teaching data being teaching data corresponding to the failure image; and
   a learning step of performing machine learning using the first teaching data and second teaching data, the second teaching data being teaching data corresponding to the good image, wherein
   high-density pseudo-failure data and low-density pseudo-failure data are used as the pseudo-failure data, and
   in the teaching data generating step, for a print image determined in the density determining step to be the high-density image, the first teaching data is generated by combining the low-density pseudo-failure data with corresponding to-be-combined image data, and for a print image determined in the density determining step to be the low-density image, the first teaching data is generated by combining the high-density pseudo-failure data with corresponding to-be-combined image data.

2. The method for building an image determination model according to claim 1, wherein
   the low-density pseudo-failure data is image data representing a streak-like image resulting from missing ink upon printing by the printing device, and
   the high-density pseudo-failure data is image data representing an ink smudge.

3. The method for building an image determination model according to claim 1, wherein the pseudo-failure data is image data extracted from a print image outputted from the printing device in past.

4. The method for building an image determination model according to claim 1, wherein the pseudo-failure data is image data generated randomly using graphics creating means.

5. The method for building an image determination model according to claim 4, wherein in the teaching data generating step, upon generating first teaching data corresponding to a print image determined in the density determining step to be the low-density image, high-density pseudo-failure data having an attribute that is determined using random numbers is combined with the to-be-combined image data.

6. The method for building an image determination model according to claim 5, wherein in the teaching data generating step, upon generating first teaching data corresponding to a print image determined in the density determining step to be the low-density image, high-density pseudo-failure data representing an image having gradation in a mode that is determined using random numbers is combined with the to-be-combined image data.

7. The method for building an image determination model according to claim 4, wherein in the teaching data generating step, upon generating first teaching data corresponding to a print image determined in the density determining step to be the low-density image, the high-density pseudo-failure data is combined with the to-be-combined image data such that an image of the high-density pseudo-failure data is placed at a location determined using random numbers.

8. The method for building an image determination model according to claim 1, wherein
   the printing device performs printing using C, M, Y, and K color inks, and
   in the teaching data generating step, for a print image determined in the density determining step to be the high-density image, the first teaching data is generated by removing a component of at least one ink color among ink colors included in the to-be-combined image data in a CMYK color space from the to-be-combined image data.

9. The method for building an image determination model according to claim 1, wherein the first teaching data is automatically generated by performing a process of the density determining step and a process of the teaching data generating step without through an operator's operation after selecting, by an operator, a print image based on which the first teaching data is generated.

10. The method for building an image determination model according to claim 9, wherein in the teaching data generating step, by repeating a process of combining the pseudo-failure data with the to-be-combined image data, a plurality of pieces of the first teaching data are generated from the single piece of the to-be-combined image data.

11. The method for building an image determination model according to claim 1, comprising, between the teaching data generating step and the learning step, an original-image appending step of appending the original-image data or data corresponding to the original image data to the first teaching data and the second teaching data.

12. An image determination model that has been learned and that determines whether a print image outputted to a printing medium from a printing device is a good image or a failure image, the image determination model comprising:

a neural network unit configured to hold a parameter determined by machine learning; and a result output unit configured to output a result of a determination as to whether the print image is a good image or a failure image, on a basis of determination data outputted from the neural network unit, wherein the parameter is determined by machine learning that uses first teaching data and second teaching data, the first teaching data being teaching data corresponding to the failure image, and the second teaching data being teaching data corresponding to the good image, and the first teaching data includes data generated by combining high-density pseudo-failure data with to-be-combined image data corresponding to a low-density print image; and data generated by combining low-density pseudo-failure data with to-be-combined image data corresponding to a high-density print image, captured-image data or original-image data serving as the to-be-combined image data, the captured-image data being obtained by capturing the print image on the printing medium, and the original-image data representing an original image of the print image.

13. An image determination method that determines whether a print image outputted to a printing medium from a printing device is a good image or a failure image, the method comprising:

a model building step of building an image determination model including a neural network unit that holds a parameter determined by machine learning; and a determining step of obtaining a result of a determination as to whether a target image is the good image or the failure image, using the image determination model, the target image being a determination target print image, wherein the model building step includes:

a density determining step of determining whether the print image is a high-density image or a low-density image, on a basis of captured-image data or original-image data representing an original image of the print image, the captured-image data being obtained by capturing the print image on the printing medium;

a teaching data generating step of generating first teaching data by combining pseudo-failure data with to-be-combined image data, based on a result of the determination in the density determining step, the captured-image data or the original-image data serving as the to-be-combined image data, and the first teaching data being teaching data corresponding to the failure image; and a learning step of performing machine learning using the first teaching data and second teaching data, the second teaching data being teaching data corresponding to the good image, high-density pseudo-failure data and low-density pseudo-failure data are prepared as the pseudo-failure data, in the teaching data generating step, for a print image determined in the density determining step to be the high-density image, the first teaching data is generated by combining the low-density pseudo-failure data with corresponding to-be-combined image data, and for a print image determined in the density determining step to be the low-density image, the first teaching data is generated by combining the high-density pseudo-failure data with corresponding to-be-combined image data, and the neural network unit holds a parameter obtained in the learning step.

14. The image determination method according to claim 13, comprising:

an image capturing step of obtaining the captured-image data by capturing the print image on the printing medium; and a checking step of checking whether the print image has a failure portion, by comparing the captured-image data with the original-image data, wherein in the teaching data generating step, captured-image data or original-image data corresponding to a print image that is not actually a failure image among print images being determined by the check in the checking step to have a failure portion serves as the to-be-combined image data.

* * * * *